United States Patent
Pandey et al.

(10) Patent No.: US 12,354,076 B2
(45) Date of Patent: Jul. 8, 2025

(54) SDK FOR DYNAMIC WORKFLOW RENDERING ON MOBILE DEVICES

(71) Applicant: PayPal, Inc., San Jose, CA (US)

(72) Inventors: Anilabh Pandey, Bangalore (IN); Rahul Srivastava, Bangalore (IN); Geetha Kodandaraman, Bengaluru (IN); Arun Sridharamurthy, Bengaluru (IN); Kartik Srivastava, Karnataka (IN); Jyothish Kozhipurath, Kerala (IN); Sudeep Unnikrishnan, Kerala (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/230,159

(22) Filed: Aug. 3, 2023

(65) Prior Publication Data

US 2024/0029047 A1 Jan. 25, 2024

Related U.S. Application Data

(63) Continuation of application No. 17/513,787, filed on Oct. 28, 2021, now Pat. No. 11,756,019, which is a
(Continued)

(51) Int. Cl.
| | |
|---|---|
| G06F 16/00 | (2019.01) |
| G06Q 20/12 | (2012.01) |
| G06Q 20/32 | (2012.01) |
| G06Q 30/0601 | (2023.01) |
| H04L 67/10 | (2022.01) |
| G06F 9/50 | (2006.01) |

(52) U.S. Cl.
CPC .......... *G06Q 20/322* (2013.01); *G06Q 20/12* (2013.01); *G06Q 30/0641* (2013.01); *H04L 67/10* (2013.01); *G06F 9/5072* (2013.01)

(58) Field of Classification Search
CPC .. G06Q 30/0641; G06Q 20/322; G06Q 20/12; H04L 67/10; H04L 63/20; H04L 63/1416; G06F 9/5072; G06F 9/542; G06F 21/554; G06F 21/552
See application file for complete search history.

(56) References Cited

U.S. PATENT DOCUMENTS

| 10,120,954 B2 | 11/2018 | Desineni et al. |
| 2013/0305218 A1 | 11/2013 | Hirsch et al. |
| (Continued) | | |

*Primary Examiner* — Yicun Wu
(74) *Attorney, Agent, or Firm* — HAYNES AND BOONE, LLP

(57) ABSTRACT

A first request to conduct a transaction via a mobile application is received from a user of the mobile application. In response to the receiving of the first request, a first portion of a transaction flow is rendered on a graphical user interface of the mobile application. A determination is made that the mobile application is unable to render a second portion of the transaction flow. In response to the determining, a second request is sent to a server to provide details for the second portion of the transaction flow. After the sending, computer programming code is received. The computer programming code corresponds to the details of the second portion of the transaction flow. Based on the received computer programming code, the second portion of the transaction flow is rendered for the mobile application on the mobile device.

20 Claims, 10 Drawing Sheets

Related U.S. Application Data continuation of application No. 16/904,320, filed on Jun. 17, 2020, now Pat. No. 11,176,534.

(56) References Cited

U.S. PATENT DOCUMENTS

| | | | |
|---|---|---|---|
| 2020/0092335 A1* | 3/2020 | Brooks | G06F 9/542 |
| 2021/0019707 A1 | 1/2021 | Sathiamoorthy et al. | |
| 2023/0049095 A1* | 2/2023 | Rangaraj | H04L 9/3247 |

* cited by examiner

```
900
{
  "name": "submit_btn",
  "type": "VIEW_ELEMENT",
  "widget": {
    "type": "action_btn",
    "content": "Submit"
  },
  "style": {
    "font": "mdBig14",
    "margin": "0 0 0",
    "size": "h:48",
    "background_color": "#0070BA",
    "text_color": "#FFFFFF"
  },
  "actions": [
    {
      "trigger": "CLICK",
      "effects": [
        {
          "type": "SUBMIT",
          "arguments": [
            {"title":"Confirming your info..."},
            {"subtitle":"We encrypt your information and transmit it securely."}
          ]
        }
      ]
    }
  ]
}
```

DATA COLLECTED FROM USER
920

```
{
  "post_data": {
    "encry_acct_id": "26CDS59MQFBC6",
    "post_data": {
      "intro_section": {
      },
      "date_of_birth": "02/21/1990",
      "home_address": "7170591277660404246",
      "address": {
        "id": "",
        "line1": "788971 Stout Drive",
        "line2": "132539 Holcomb Bridge Road #530",
        "city": "Bowman",
        "state": "SC",
        "postal_code": "29018",
        "country_code": "US"
      },
      "tax_id_preference": "ssn",
      "ssn": "1111"
    }
  }
}
```

500

You're almost done. We just need your tax ID number.
We're required by law to collect this info.

Tax ID number
Social Security Number

Last 4 digits of your SSN *

910
Submit

Fig. 9

SDK FOR DYNAMIC WORKFLOW RENDERING ON MOBILE DEVICES

CROSS-REFERENCE TO RELATED APPLICATIONS

This application is a continuation of U.S. patent application Ser. No. 17/513,787, filed Oct. 28, 2021, which is a continuation of U.S. patent application Ser. No. 16/904,320, filed on Jun. 17, 2020, now U.S. Pat. No. 11,176,534, the disclosure of which is incorporated herein by reference in its entirety.

BACKGROUND

Field of the Invention

The present application generally relates to software development kits (SDKs). More particularly, the present application involves implementing an SDK on a mobile device, so that workflows of mobile apps running on the mobile device can be dynamically updated without having the app developer update the mobile app itself.

Related Art

Rapid advances have been made in the past several decades in the fields of computer technology and telecommunications. As a result, these advances allow mobile applications to flourish on mobile devices. For example, mobile applications installed on a mobile device (e.g., APPLE™ 'PHONE') may be used to browse the web, participate in social networks, conduct online transactions, send instant messages, view digital videos or photographs, play electronic games, etc. Sometimes it may be desirable to change a workflow (e.g., how the different pages of a mobile application are presented) of the mobile application. Unfortunately, existing mobile applications cannot update their workflows dynamically. Instead, a developer or operator of the mobile application may be required to release a new version of the mobile application for the updated workflow to take effect. Furthermore, a mobile application may natively support only a limited set of workflows. Therefore, in certain situations, the mobile application may lack the capability to render certain workflows without receiving additional input. As such, although conventional mobile applications have been generally adequate for their intended purposes, they have not been entirely satisfactory in every aspect, which can be more problematic as apps become increasing complex and add more and more functionality and improvements.

BRIEF DESCRIPTION OF THE FIGURES

FIGS. 3-9 illustrate graphical user interface (GUI) pages of various workflows according to various aspects of the present disclosure.

Figure 1:
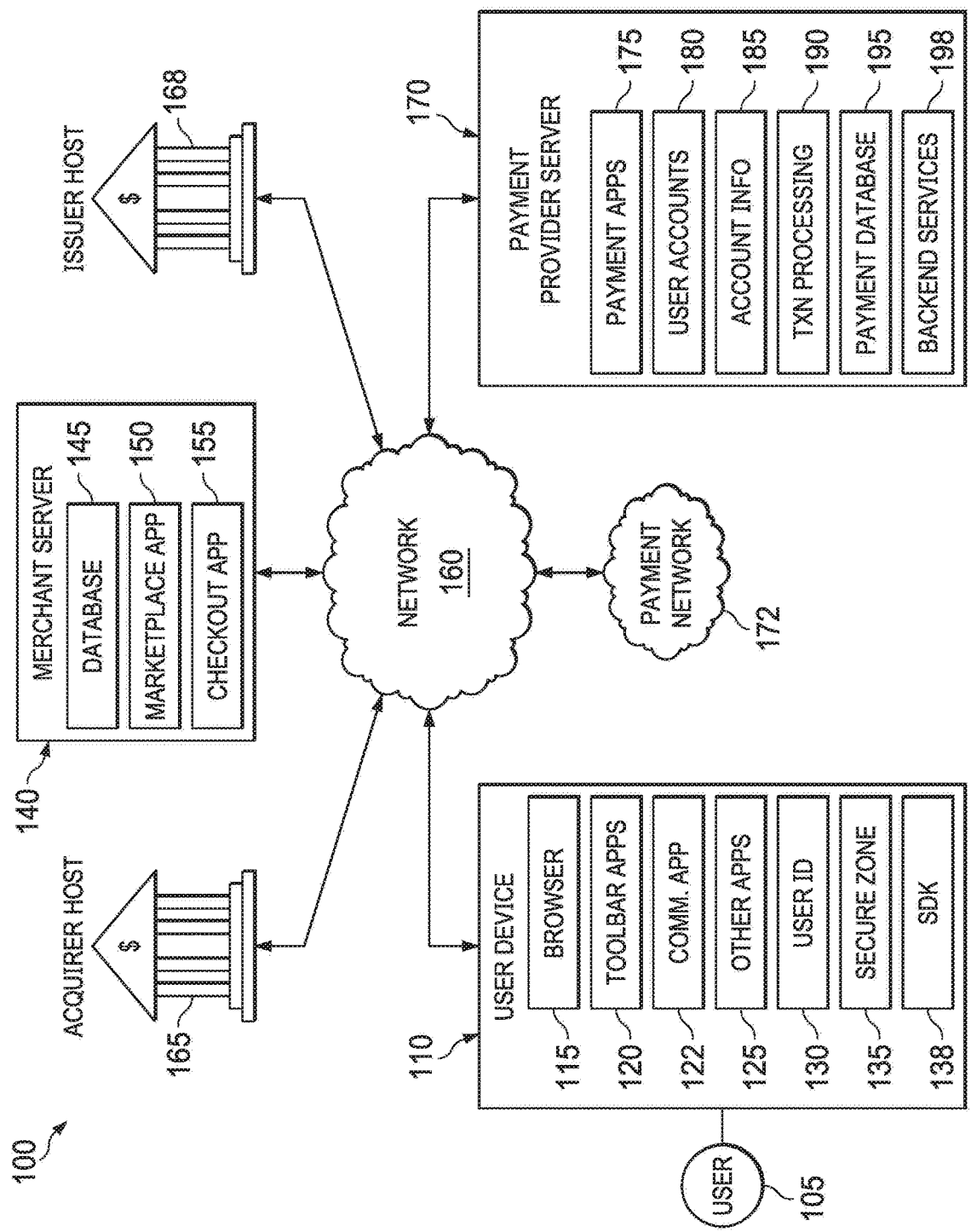
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to a mobile Software Development Kit (SDK) that offers improved functionality and versatility for mobile applications. The recent popularization of mobile devices such as smartphones (e.g., APPLE™ IPHONE™), tablet computers (e.g., APPLE™ IPAD™), or wearable devices (e.g., APPLE™ WATCH™) has also led to a proliferation of mobile applications. The mobile applications may be used to browse the web, participate in social networks, conduct online transactions, send instant messages, view digital videos or photographs, play electronic games, etc. However, conventional mobile applications typically have a limited set of workflows hard-coded into the mobile application. That is, conventional mobile applications may only be able to render a specific workflow (or at best a limited set of workflows), which may not be sufficient in certain contexts such as in a Consumer Identification Platform (CIP) context. In order to update the workflow of a mobile application or to update other functionality or content of the conventional mobile application (e.g., fixing bugs or security loopholes), a developer or operator of the conventional mobile application may have to release a new version of the mobile application that is downloadable via an online application marketplace, such as the APPLE™ APPSTORE™. This process may be inefficient and require computing resources and power, as well as cumbersome and inconvenient for the user.

To overcome the limitations of conventional mobile applications, the present application provides a Software Development Kit (SDK) that can render workflows (such as transaction flows) dynamically for a mobile application. In some embodiments, the SDK may be implemented as a part of a mobile application running on the mobile device, and the SDK may communicate with the rest of the mobile application. Based on the communication with the mobile application, the SDK may determine that the mobile application is only able to render a first portion of a workflow (such as a workflow for a transaction) but not the second portion of the workflow. As an example, the workflow may involve CIP, which requires the user of the mobile application to provide or verify its identity when the user is attempting to conduct a certain type of transaction (e.g., transactions above a certain monetary limit, and/or transactions that may involve certain geographical locations). The SDK may then communicate with an external server and request the server to send the details of the second portion of the workflow to be rendered.

Based on the type of transaction that the user is attempting to conduct, a server may determine a suitable workflow, which would include one or more elements that specify the skeletal structure of the workflow to be rendered, such as the number of pages used to present the workflow, what user interface (UI) elements are included on each page, etc. In some embodiments, the workflow is defined by a corresponding programming code template. The server may be able to access a plurality of different programming code templates, where each of the programming code templates defines a different workflow. Here, the server may select the programming code template that is best suited to render the workflow to complete the transaction. The server may also parse the programming code template and generate a more detailed description (e.g., in the form of computer programming code) of the second portion of the workflow to be rendered to specifically suit the mobile application and the context in which the second portion of the workflow should be rendered.

The server then transmits the computer programming code corresponding to the second portion of the workflow to the SDK. The SDK receives the computer code from the server, interprets it, and renders the second portion of the workflow for the mobile application dynamically. In this manner, the users may use or have access to updated functionalities of a mobile application without having to wait for a new version of the mobile application to be released and updated on the user's mobile device. Note that the term workflow, as used herein, may include a transaction flow (e.g., the user interface experience offered by the mobile application to complete an electronic transaction). In some embodiments, the transaction flow may be a transaction flow to complete a transaction (whether the transaction is financial or not). For example, the transaction flow may include an electronic flow for a transaction as experienced by a user, for example a flow of pages of a mobile application that correspond to a KYC transaction, or a customized user experience pertaining to the UI elements associated with the pages as the transaction is conducted. However, the workflow is not limited to only transaction flows. In other embodiments, a workflow may include non-transaction-related user experiences as well. For example, a workflow may include the workflow for a gaming application, or a social media application, etc, that do not necessarily involve a transaction. If the mobile application corresponding to these other types of applications is unable to render a second portion of a workflow (again, not necessarily a transaction flow), or would otherwise require an official update to the mobile application (e.g., via a release of a newer version of the mobile application), the SDK may be employed to dynamically render the second portion of the workflow accordingly. The various aspects of the SDK will be discussed below in more detail.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal™, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the Appstore™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, an SDK 138 may be implemented on the user device 110, and backend services 198 may be implemented on the payment provider server 170. The SDK 138 and the backend services 198 may work in conjunction with one another to dynamically render workflows for mobile apps. In more detail, the SDK 138 may communicate with the apps 120, 122, or 125. Based on the communication, the SDK may determine that the apps 120, 122, or 125 may be able to render a first portion of a workflow but may be unable to render a second portion of the workflow. The SDK 138 may then communicate with the backend services 198 to request details of the second portion of the workflow.

The backend services 198 may determine a programming code template that is suitable for the particular mobile application and/or for the context in which the second portion of the workflow should be rendered for the mobile application. In some embodiments, a database such as the payment database 195 may store a plurality of programming code templates, where each programming code template contains the core structures of the data points and the layout specification for a workflow. The backend services 198 may select a suitable programming code template from the payment database 195, parse the programming code template to generate a more detailed workflow, and send the detailed workflow to the SDK 138 in the form of computer programming code, for example as JavaScript Object Notation (JSON) code.

The SDK 138 receives the computer programming code from the backend services 198, interprets it, and renders the second portion of the workflow dynamically for the apps 120, 122, or 125. The workflow rendering is dynamic in the sense that the SDK 138 is unware of the details of the second portion of the workflow until it receives the computer programming code from the backend services 198. As such, the backend services 198 may dynamically and flexibly change the workflow that is rendered by sending the SDK 138 different programming code templates, and/or by selecting a different programming code template or adjusting workflow based on the programming code template, which causes different computer programming code to be sent to the SDK 138. The SDK 138 may then render an adjusted workflow "on the fly", which provides a new experience for the user of the mobile application.

It is noted that although the SDK 138 is illustrated as being separate from the apps 120, 122, or 125 in the embodiment shown in FIG. 1, the SDK 138 may be integrated into any (or all) of the apps 120, 122, or 125 in other embodiments. Similarly, although backend services 198 is illustrated as being separate from the transaction processing application 190 in the embodiment shown in FIG. 1, the transaction processing application 190 may implement some, or all, of the functionalities of the backend services 198 in other embodiments. In other words, the backend services 198 may be integrated within the transaction processing application 190 in some embodiments. In addition, it is understood that the backend services 198 (or another similar program) may be implemented on the merchant server 140, on a server of any other entity, or even on a portable electronic device similar to the user device 110 (which may belong to an entity operating the payment provider server 170) as well.

It is also understood that the SDK 138 and the backend services 198 may each include one or more sub-modules that are configured to perform specific tasks. For example, in some embodiments, the SDK 138 may include a data collection module that is configured to communicate with the apps 120, 122, or 125 and with the backend services 198. The SDK 138 may also include a flow-rendering module that is configured to interpret the computer programming code received from the backend services 198 and render the workflow dynamically. Meanwhile, the backend services 198 may include a data transformation module configured to communicate with the SDK 138, as well as an Adroit module configured to determine and select the programming code template to be provided to the SDK 138 for dynamic rendering on the user device 110. The data transformation module of the backend services 198 may also be configured to parse the programming code template sent by the Adroit module in order to generate a detailed workflow based on the programming code template. These modules of the SDK 138 and the backend services 198 will be discussed below in more detail.

Still referring to FIG. 1, the payment network 172 may be operated by payment card service providers or card associations, such as DISCOVER™, VISA™ MASTER- CARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
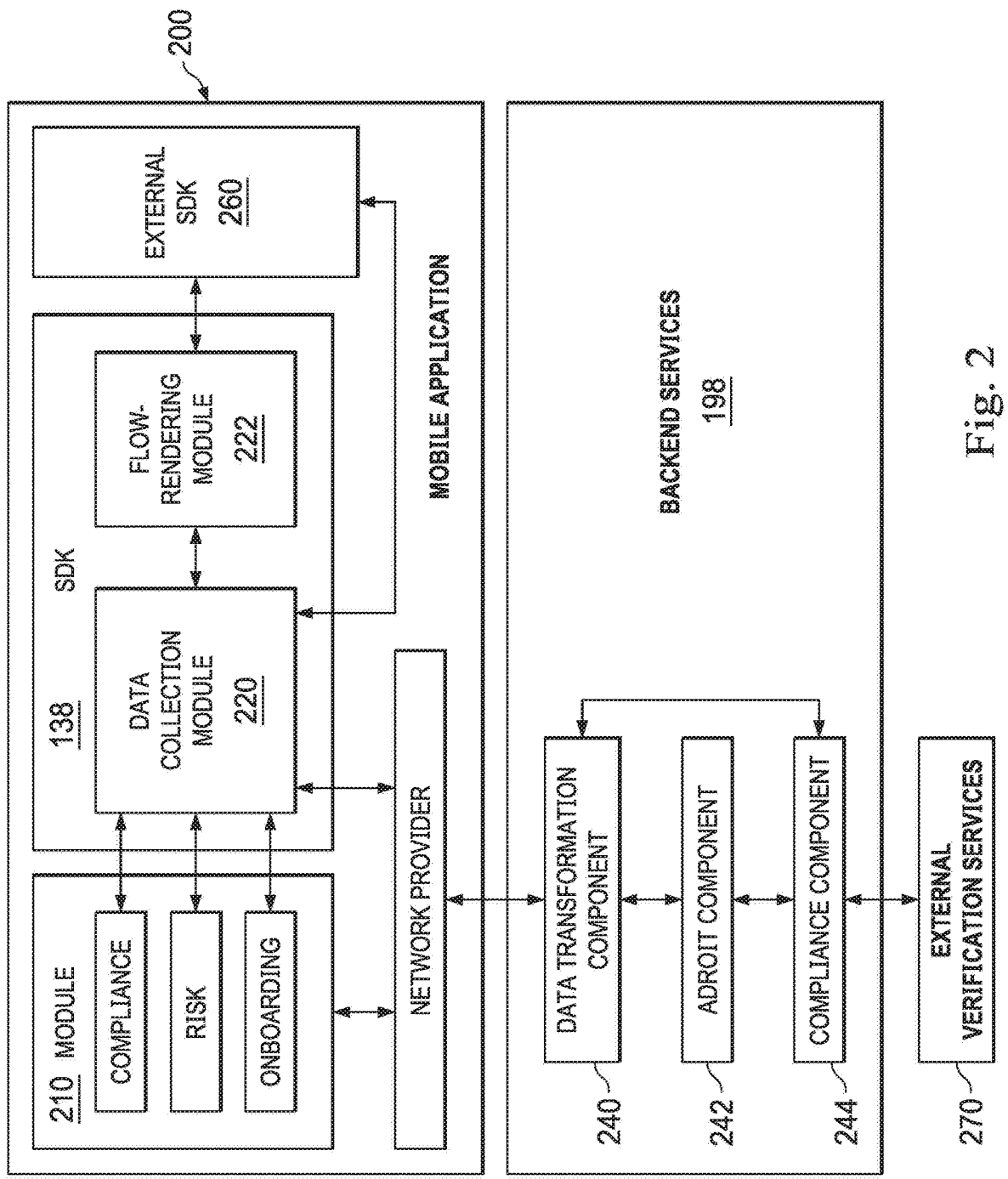
FIG. 2 is a block diagram illustrating the various components of a mobile application and the various components of a server according to various aspects of the present disclosure.

FIG. 2 is a simplified block diagram illustrating a process of dynamically rendering a portion of a workflow according to embodiments of the present disclosure. FIG. 2 illustrates a mobile application 200 that is implemented on a mobile device such as the user device 110 of FIG. 1. The mobile application 200 may be an embodiment of any one of the apps 120, 122, or 125 of FIG. 1. In some embodiments, the mobile application 200 may be used to conduct electronic transactions, such as the purchasing of goods or services, or transferring monetary funds to other entities or other users. In the illustrated embodiment, the SDK 138 is implemented within (or integrated into) the mobile application 200. However, the SDK 138 may also be implemented separately from the mobile 200 (but still residing on the user device 110) in other embodiments.

The mobile application 200 may be capable of rendering a first portion of a workflow. In more detail, the mobile application 200 includes a module 210. That module 210 may include a compliance component, a risk component, and an onboarding component. The compliance component may be configured to check whether a particular user-initiated transaction is compliant with a set of predetermined rules. The risk component may be configured to assess the risk of a user-initiated transaction. The onboarding component may be configured to onboard a new user for the mobile application 200. Each of these components of the module 210 may be associated with a first portion of a workflow. For example, the mobile application 200 may display one or more pages of a user interface (UI) via a display screen of the user device. Via certain UI elements on these pages, the user may select the products/services to buy, or funds to send to other users, as a part of a transaction.

The user-initiated transaction may cause the compliance component, the risk component, and/or the onboarding component of the module 210 to generate a Consumer Identification Platform (CIP) request. The CIP request may be a part of a "Know Your Customer" (KYC) check that is a mandatory process of identifying and verifying the identity of a user when the user opens an account or performs certain types of transactions. In other words, the KYC check allows the entities (e.g., financial institutions) interfacing with clients to make sure that their clients are genuinely who they claim to be. If minimum KYC requirements are not met, the entities may refuse to open an account for a prospective client, suspend transactions with the client, or request further details from the client. In doing so, nefarious activities such as money laundering, terrorism financing, or other illegal scheme or corrupt activities may be timely identified and prevented.

In any case, the module 210 may generate the CIP request, which may require a second portion of the workflow to complete. However, since the workflows natively available at the mobile application 200 are hard-coded, the mobile application 200 itself may not be able to render the second portion of the workflow needed to complete the CIP request. To complete the workflow rendering, the present application utilizes the SDK 138, which is absent in conventional mobile devices or conventional mobile applications. In the embodiment shown in FIG. 2, the SDK 138 may include a data collection module 220 and a flow-rendering module 222. The data collection module 220 is configured to communicate with the module 210. For example, the data collection module 220 may receive the CIP request from the module 210. At this point, data collection module 220 understands that a workflow corresponding to the CIP request needs to be rendered, but it is agnostic as to the details of the workflow. It is understood that although a CIP request (as a part of the KYC) is used as a non-limiting example corresponding to a situation where the mobile application is unable to render a second portion of a workflow to complete a task/transaction. The concepts of the present disclosure apply to a variety of other situations (i.e., not CIP or KYC situations) where a mobile application is unable to render a second portion of a workflow, or at least not able to render an optimal second portion of the workflow, and therefore the SDK 138 (or some other similar component) may be used to render the second portion of the workflow for the mobile application.

In order to obtain the details of the workflow to be rendered to complete the CIP request, the data collection module 220 communicates with the back services 198 via a network provider 230. In the embodiment shown in FIG. 2, the backend services 198 include a data transformation component 240, an Adroit component 242, and a compliance component 244. The data transformation component 240 may communicate with the data collection module 220 via the network provider 230. The communication may include a request sent from the data collection module 220 for the backend services 198 to provide detailed descriptions (e.g., in the form of computer programming code) of the workflow to be rendered to complete the CIP request. The data transformation component 240 may then process the request from the data collection module 220, so that it is in a format that can be understood by the Adroit component 242. The data transformation component 240 then passes the request to the Adroit component 242.

The Adroit component 242 has a plurality of predefined programming code templates for rendering workflows (or portions thereof), or at least has the ability to access the plurality of programming code templates. In that regard, a programming code template for a workflow includes programming code that defines the core structures of the data points and layout specification for the user interface elements involved in the workflow rendering. The Adroit component 242 may determine, based on the relevant details contained in the request sent from the data collection module 220, which of the programming code templates is suitable for rendering the second portion of the workflow to complete the CIP request. In some embodiments, different types of CIP requests may correspond to different programming code templates. For example, a CIP request triggered/generated by a first type of mobile application (e.g., a banking mobile application) may have a different programming code template than a CIP request triggered/generated by a second type of mobile application (e.g., a social networking mobile application). As another example, a CIP request triggered/generated by a monetary threshold (e.g., transactions greater than $1000) may have a different programming code template than a CIP request triggered/generated by a geographical location (e.g., a transaction request arising in Vietnam when the user's primary residence is in California, U.S.A.). In any case, the Adroit component 242 is able to make a determination as to which programming code template to select based on the relevant details contained in the request sent from the data collection module 220. In some embodiments, the Adroit component 242 may prepopulate some of the data fields (e.g., a user's first name and last name) of the workflow if such information is available. The Adroit component 242 then sends the selected programming code template to the data transformation component 240.

The data transformation component 240 parses the programming code template so that it is fit for consumption by the SDK 138. The data transformation component 240 may also generate detailed descriptions of the workflow flow based on the skeletal structures defined by the template received from the Adroit component 242. In some embodiments, the data transformation component 240 outputs computer programming code (e.g., in a JSON format) that corresponds to the detailed workflow descriptions that are generated based on the selected programming code template. The data transformation component 240 then sends the computer programming code to the data collection module 220 via the network provider 230.

The data collection module 220 then invokes the flow-rendering module 222 to interpret the computer programming code corresponding to the detailed workflow descriptions. The flow-rendering module 222 interprets the computer programming code and renders the workflow corresponding to the computer programming code. Thus, in the example discussed above where the module 210 renders the first portion of the workflow, the flow-rendering module 222 renders the second portion of the workflow to complete the CIP request. Again, the workflow generation herein is dynamic and "on the fly" in the sense that neither the data collection module 220 nor the flow-rendering module 222 knew how the second portion of the workflow should be rendered until the computer programming code is received from the backend services 198. As such, the backend services 198 may flexibly reconfigure the workflow to be rendered on the mobile device merely by selecting different programming code templates and/or by generating different detailed workflow descriptions based on the programming code template, and then sending the corresponding computer programming code to the SDK 138.

Note that in the process of rendering the workflow, the SDK 138 may also invoke additional services from an external SDK 260. The external SDK 260 may provide services such as advanced data capture, such as using a camera of the mobile device to capture an image of a driver's license, a user's face, or another document/object. The external SDK 260 may be provided by a third party, and it may be integrated within the mobile application 200 in some embodiments, or it may be implemented outside of the mobile application 200 (but still on the mobile device) in other embodiments.

The user of the mobile device may enter data via the second portion of the workflow rendered by the flow-rendering module 222. For example, the user may enter his/her date of birth, social security number, age, residence, etc. The data entered by the user may then be sent back to the backend services 198 (e.g., via the data collection module 220, the network provider 230, the data transformation component 240). The compliance component 244 of the backend services 198 may receive the user-entered data from the data transformation component 240. In that regard, the compliance component 244 serves as a checkpoint for the CIP request. The compliance component 244 checks the received data entered by the user and verifies that the data is free of fraud. In some embodiments, the compliance component 244 may communicate with other components of the payment provider server 170 (e.g., payment database 195 or account info 185) to verify the authenticity and legitimacy of the data entered by the user. In some embodiments, the compliance component 244 may also communicate with external verification services 270 to verify the data.

Once the compliance component 244 fully verifies the data provided by the user, it may ask the data transformation component 240 to communicate a notification back to the module 210 that the CIP request has been successfully completed. On the other hand, if the compliance component 244 is unable to verify the data provided by the user, it may ask the data transformation component 240 to communicate a notification back to the module 210 that the CIP request has failed. In some embodiments, the backend services 198 may instruct the SDK 138 to render a workflow that prompts the user for additional or alternative ways of verification. In some embodiments, the programming code template may be updated or revised based on the captured user data. For example, the server may determine, based on the captured user data, that additional UI elements are needed to capture further identity details of the user. The server (e.g., the server 170 via the backend services 198) may then revise the programming code template to include one or more UI elements for capturing the further identity details. As another example, the backend services 198 may have provided a first programming code template to the SDK 138 for rendering. As the SDK 138 is rendering the workflow according to the first programming code template, the backend services 198 may receive information from the SDK 138 (e.g., data enter by the user on a GUI page rendered according to the workflow specified by the first programming code template). The backend services 198 may determine, based on the information received from the SDK 138, that a second (i.e., new) programming code template should be provided to the SDK 138 for rendering on the mobile device, where the second programming code template may be better suited to process the user data or better suited to handle the request. The backend services 198 may then cause the workflow to be interrupted, so that the second programming code template can be provided to the SDK 138 for dynamic rendering instead. Of course, the backend services 198 may send instructions to the SDK 138 to resume rendering the workflow according to the first programming code template when the information received from the SDK 138 indicates that doing so would be expedient. In various embodiments, the revised programming code template or the new programming code template may be sent to the mobile application to complete the current transaction, or it may be saved on the backend services 198 and deployed for future transactions originating from the mobile application or other mobile applications FIGS. 3-9 illustrate pages of a graphical user interface (GUI) of a mobile application at different points of a workflow 300 and a workflow 500 according to embodiments of the present disclosure. The mobile application may be an embodiment of the mobile application 200 of FIG. 2. The workflow 300 is the portion of the workflow that is generated or rendered by the mobile application itself. In other words, the workflow 300 is hardcoded into the mobile application or is natively supported by the mobile application. In contrast, the workflow 500 is dynamically generated or rendered by the SDK 138 in conjunction with the backend services 198 discussed above. In some embodiments, the mobile application by itself may lack the capability to render the workflow 500 and therefore must turn to the SDK 138 to render the workflow 500. It is understood that the pages of the GUI corresponding to the workflows 300 and 500 are merely non-limiting examples and may not be complete. The GUI for the workflow 300 and the workflow 500 may include other pages of the GUI, which are not specifically illustrated herein for reasons of simplicity.

Figure 3:
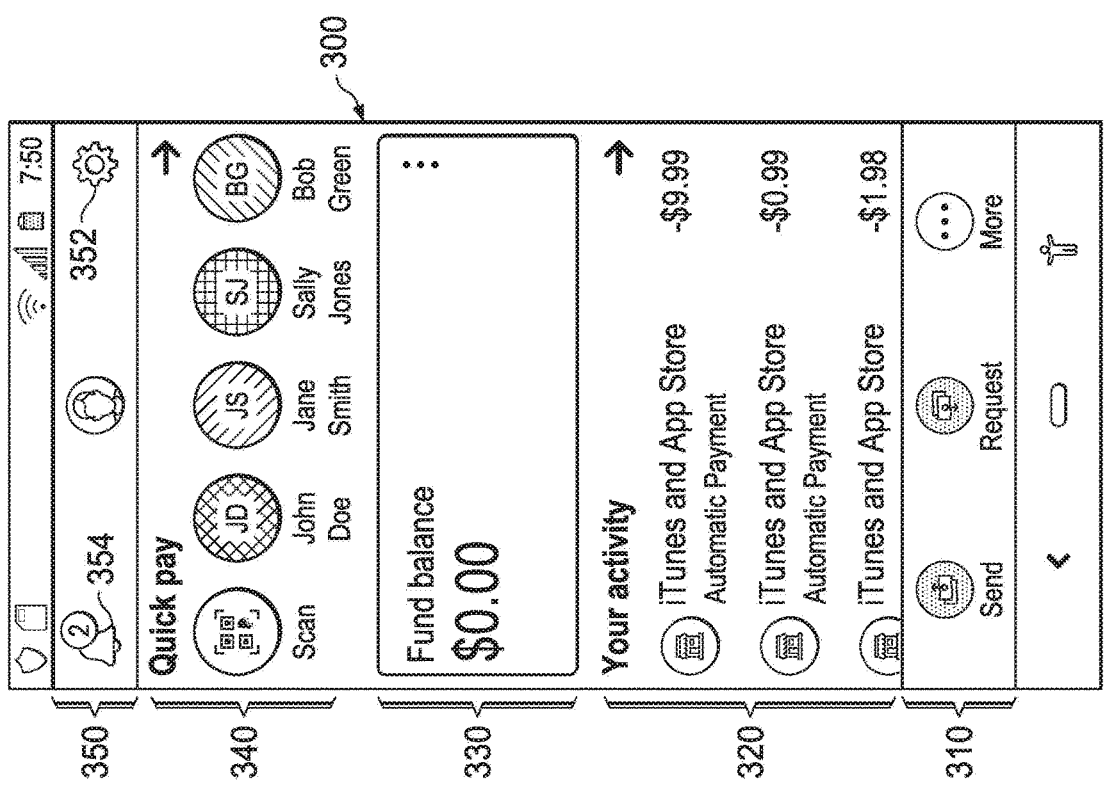

Referring now to FIG. 3, the GUI page corresponding to the workflow 300 illustrates a home page of a mobile application, for example, a mobile application of a financial institution. The GUI page may include an options menu 310, where the user of the mobile application may use to send funds to another user or request funds from another user. The GUI page may include a recent activity list 320, where the user's most recent transactions are displayed (e.g., payments to the "iTunes and App Store"). The GUI page may include a fund balance 330 that indicates the current available amount of funds in the user's account (e.g., 0.00 in this case). The GUI page may include a quick pay menu 340, where it lists the other users with whom the user has conducted transactions most recently or most frequently. The user may select one of these users to conduct another transaction with the selected user. The quick pay menu 340 may also include a "scan" button. Upon clicking the "scan" button, the camera of the mobile device on which the mobile application is running may be triggered, so that the mobile application may scan in a machine-readable code such as a Quick Response (QR) code or another type of barcode, as a part of a transaction. The GUI page may further include a settings and alerts menu 350, where the user may click on a settings icon 352 to adjust the settings of the mobile application, or where the user may click on an alerts icon 354 to see a list of alerts that have been generated by the mobile application.

Figure 4:
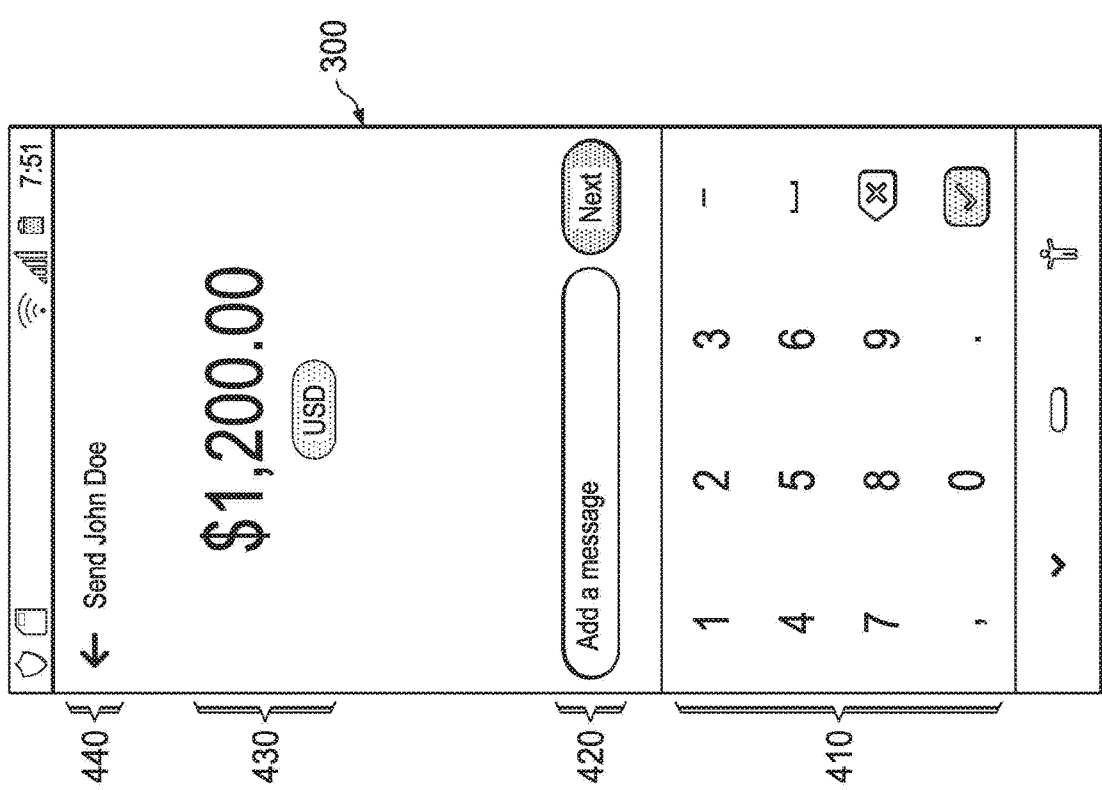

Referring now to FIG. 4, the GUI page corresponds to another part of the workflow 300. The GUI page illustrates a transaction screen. As an example, the transaction may be initiated in response to the user clicking on one of the contacts in the quick pay menu 340, which is another user named Nicholas Snyder in this case. The GUI page shown in FIG. 4 includes a keypad 410 with which the user can use to enter a payment amount, a message field 420 in which the user can type in a message to explain the payment, an amount 430 (in this case, $1200.00), and a note 440 indicating that the payment is to be sent to Nicholas Snyder.

Sending funds exceeding a predetermined threshold may trigger a CIP request. In this example, the threshold is $1000, which is exceeded by the $1200 that the user is attempting to send to the other user Nicholas Snyder. According to various aspects of the present disclosure, the mobile application by itself may not have the capability to render the workflow needed to complete such a CIP request.

Therefore, the mobile application sends the CIP request to the SDK 138 discussed above and asks for the assistance from the SDK 138 in rendering the rest of the workflow associated with completing the CIP request. As discussed above, the SDK 138 may then ask the backend services 198 to send the details of the workflow, for example, in the form of computer programming code that can be interpreted by the SDK 138. The backend services 198 may then send the computer programming code (e.g., corresponding to a selected programming code template) to the SDK 138 for interpretation and dynamic workflow rendering.

Figure 5:
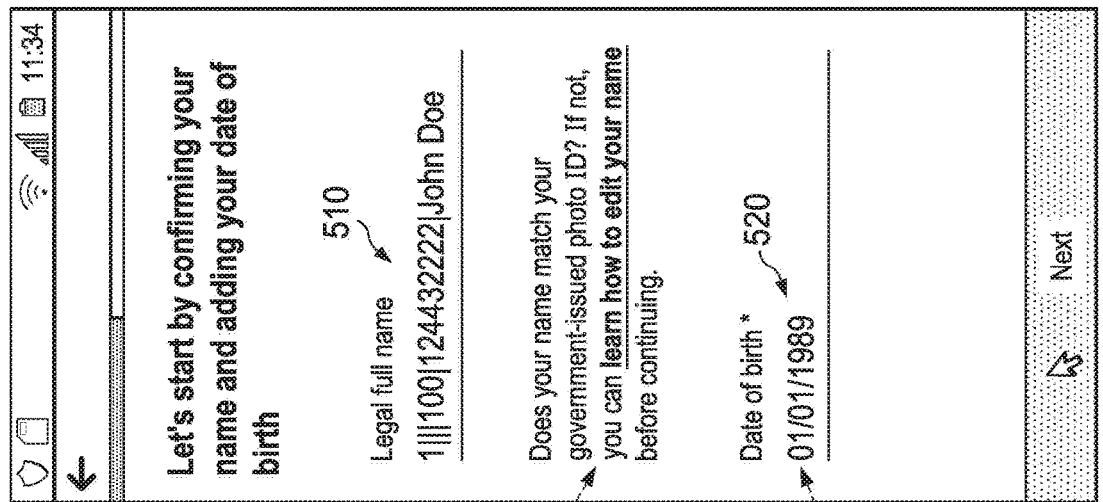

FIG. 5 shows a GUI page of the workflow 500 rendered by the SDK 138 as a result of the communication with the backend services 198, as well as some portions of the corresponding computer programming code. The GUI page may include a statement of "Let's start by confirming your name and adding your date of birth". The GUI page may also include a name field 510 in which the user can type in a legal full name (e.g., "John Angeline"). The GUI page may display a question of "Does your name match your government-issued photo ID? If not, you can learn how to edit your name before continuing." The GUI page may also include a date of birth field 520 in which the user can type in a date of birth (e.g., 01/01/1989).

FIG. 5 also displays sections of computer programming code 540 and 550 in the JSON format. The section of computer programming code 540 may be computer programming code that resides in the Adroit component 242 of FIG. 2. For example, the section of computer programming code 540 may correspond to the programming code template that the Adroit component has selected as a skeletal structure for the workflow 500 to be rendered on the mobile device. As non-limiting examples, the section of computer programming code 540 may define the name, type, content, style, and/or layout locations of the various UI elements, such as the name field 510 or the date of birth field 520. Although not specifically shown herein for reasons of simplicity, other sections of computer programming code corresponding to the programming code template may also define the number of GUI pages for the workflow, and/or the order in which the GUI pages should be rendered.

Whereas the programming code template corresponding to the section of computer programming code 540 defines a skeletal structure of the workflow, additional details of the workflow may be defined or specified by the section of the computer programming code 550, which resides in the data transformation component 240. For example, the data transformation component 240 may receive the section of computer programming code 540 from the Adroit component 242 and parse it. The data transformation component 240 may add additional details such as the statement of "Does your name match your government-issued photo ID? If not, you can learn how to edit your name before continuing". After parsing the code, the data transformation component 240 may then send the code to the SDK 138, specifically to the data collection module 220. The data collection module 220 may then ask the flow-rendering module 222 to interpret the section of computer programming code 550 and render the GUI page of the workflow 500 as shown in FIG. 5.

Figure 6:
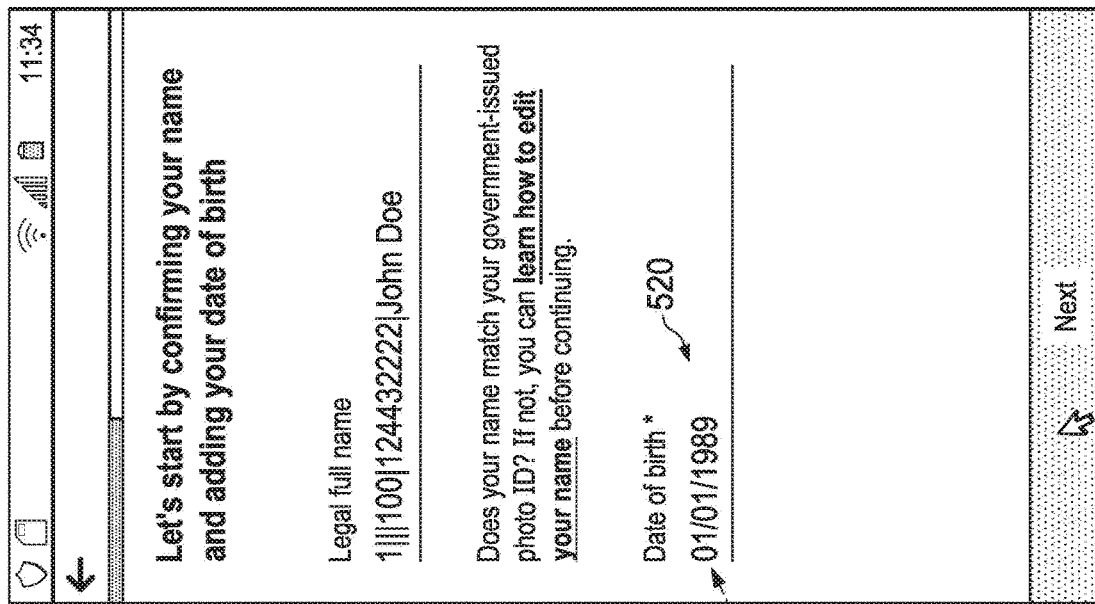

FIG. 6 shows another section of computer programming code 600 corresponding to the GUI page of the workflow 500 rendered by the SDK 138. The section of computer programming code 600 allows client-side validations to be performed on the data inputted by the user via the GUI page. In more detail, the section of computer programming code 600 may be a part of the computing programming code received from the backend services 198. The computer code is received by the data collection module 220 and interpreted by the flow-rendering module 222 to cause the GUI page of FIG. 6 to be displayed.

As the user enters data into the GUI page, for example, by entering 01/01/1989 into the date of birth field 520, the section of computer programming code 600 allows the SDK 138 to check the date of birth of 01/01/1989 against a set of predefined criteria defined by the section of computer programming code 600. As an example of the predefined criteria, the date of birth entered must be in a MM/DD/YYYY format. If the date of birth data entered does not comply with such a format, the section of computer programming code 600 may cause the GUI page to display an error message of "Check your date of birth and try again using MM/DD/YYYY format." As an example of the predefined criteria, the date of birth entered must indicate that the user is older than 18. If the date of birth data entered indicates that the user is younger than 18, the section of computer programming code 600 may cause the GUI page to display an error message of "You must be 18 or older to use PayPal." Note that the client-side validations are performed locally on the mobile device, that is, without requiring additional communication with the backend services 198.

Figure 7:
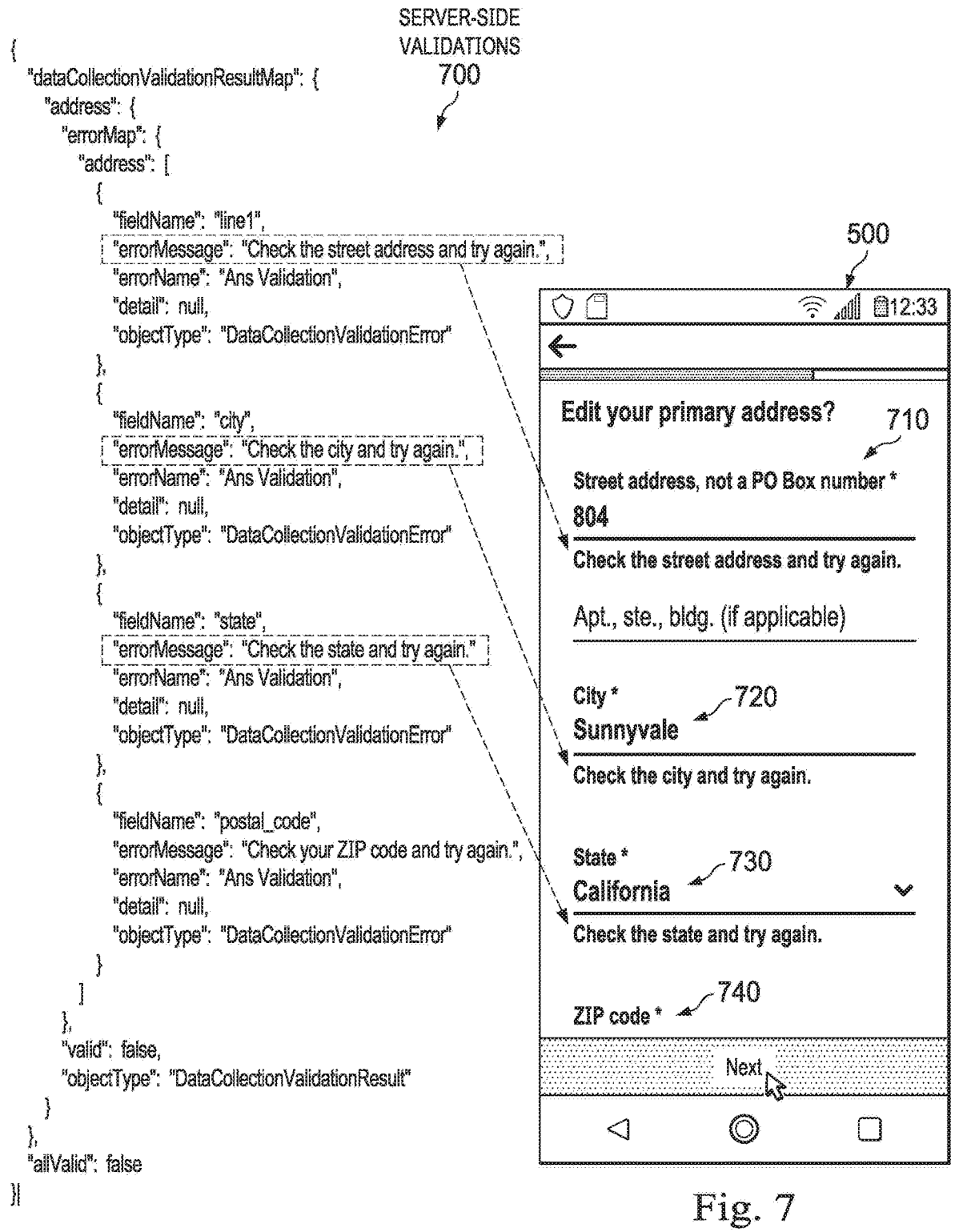

FIG. 7 shows another GUI page of the workflow 500 rendered by the SDK 138, as well as a section of computer programming code 700 corresponding to this GUI page rendered by the workflow 500. The GUI page may include a street address field 710, a city field 720, a state field 730, and a zip code field 740. The user may enter his or her address information via these fields. The section of computer programming code 700 allows server-side validations to be performed on the data inputted by the user via this GUI page. In more detail, the section of computer programming code 700 may also be a part of the computing programming code received from the backend services. The section of computer programming code 700 is received by the data collection module 220 and interpreted by the flow-rendering module 222 to cause the GUI page of FIG. 7 to be displayed.

As the user enters data into the GUI page, for example, by entering a street address of 804 into the street address field 710, or by entering a city name of Sunnyvale into the city field 720, or by entering a state name of California into the state field 730, the section of computer programming code 700 may communicate with the backend services 198 to see if the user-entered data is valid. One reason that this type of validation is performed on a server (e.g., the backend services 198), rather than locally on the mobile device itself, is that the validation may require checking the user-entered data against a database, which may be large in size, or at least too large to be feasibly stored on the mobile device locally. In some embodiments, the backend services 198 may contact the external verification services 270 to verify the validity of the user-entered data. In other embodiments, the backend services 198 may check against a database stored on the server itself, such as the database 195 of FIG. 1.

In any case, if the backend services 198 (with or without the help of the external verification services 270) determines that the user-entered data in any of the fields 710-740 is invalid, the GUI page may display one or more error messages, such as "Check the street address and try again", or "Check and city and try again", "check the state and try again", or "check your ZIP code and try again". Note that in some embodiments, the section of computer programming code 700 is provided from the backend services 198 to the SDK 138 after the user-entered data has been sent to, and checked by, the backend services 198.

Figure 8:
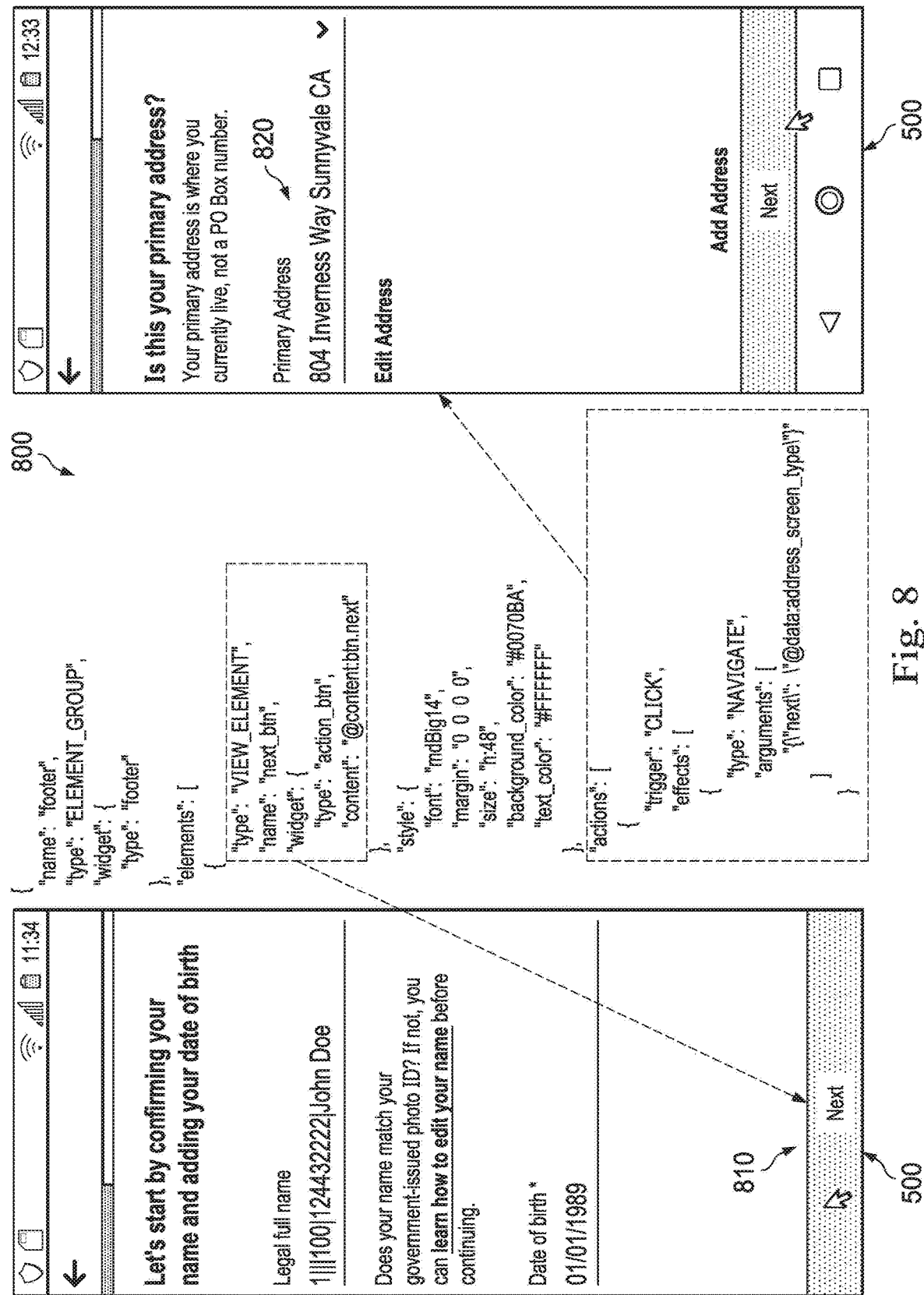

FIG. 8 shows another section of computer programming code 800 corresponding to the GUI pages rendered by the workflow 500. For example, the section of computer programming code 800 may define a UI element 810 on the GUI page rendered according to the workflow 500. The UI element 810 is a clickable "Next" button in this case, and the user may click on this button to go to a next GUI page. The section of computer programming code 800 may specify the name, type, style, content, layout, and/or functionality of the UI element 810. As another example, the section of computer programming code 800 may also define a UI element 820 that is a clickable drop down menu, where the user may select, from a list of previously-saved addresses, one of the addresses as his or her primary address. Again, the section of computer programming code 800 may specify the name, type, style, content, layout, and/or functionality of the UI element 820.

FIG. 9 shows another section of computer programming code 900 corresponding to the GUI pages rendered by the workflow 500. For example, the section of computer programming code 900 may define a UI element 910 on the GUI page rendered according to the workflow 500. The UI element 910 is a clickable "Submit" button in this case, and the user may click on this button to submit the user-entered data. The section of computer programming code 900 may specify the name, type, style, content, layout, and/or functionality of the UI element 910. FIG. 9 also shows a section of computer programming code 920 corresponding to the data collected from the user, such as date of birth, home address, social security number, etc.

Upon submission of the user-entered data, the SDK 138 sends the data collected from the user (e.g., in the form of computer programming code 920) to the backend services 198. As discussed above, the backend services 198 may perform validation or other types of verification on the data collected from the user. The backend services 198 may then inform the SDK 138 that the user has been successfully validated/authenticated, or that the user has failed the validation/authentication, or that additional information is needed from the user to complete the validation/authentication. If the user has been successfully validated/authenticated, the CIP request may be completed, and the user request to conduct the transaction (e.g., sending $1200 to Nicholas Snyder) may be processed.

Based on the above, it can be seen that the present disclosure utilizes the SDK 138 to render workflows (or portions thereof) dynamically. For example, the SDK 138, working in conjunction with the backend services 198, may be able to render a second portion of the workflow (e.g., the workflow 500) to complete the first portion of the workflow 300 rendered natively by the mobile application. The second portion of the workflow 500 may be able to flexibly define the GUI pages and the various UI elements appearing in the GUI pages. This is because the details of the workflow are specified according to the backend services 198 in response to the received request to provide a workflow, rather than being hardcoded into the mobile application ahead of time. The backend services 198 may change the workflow 500 at any time without having to wait for the mobile application to update itself (e.g., via a release of a newer version of the mobile application on a mobile app store). In contrast, conventional mobile applications would have to have the entire workflow hardcoded therein, and any update to the workflow would then require an official update (e.g., a newer version) of the mobile application.

It is understood that although the workflows 300 and 500 discussed above revolve around a transaction (and thus the workflows 300 and 500 are transaction flows in this embodiment), they are not intended to be limiting. In other embodiments, the dynamic workflow rendering of the present disclosure may be applied to other aspects of mobile application operation too, with or without involving a transaction. Likewise, although the discussions above pertain to a CIP request (e.g., as a form of KYC check), the same concepts disclosed herein may apply to non-KYC and/or none-CIP requests as well. In fact, the dynamic workflow rendering of the present disclosure may apply in any situation where it is desirable to provide a workflow "on the fly", and/or where a mobile application is unable to complete a workflow natively. For example, the dynamic workflow rendering of the present disclosure may apply to other transactions that do not necessarily involve CIP/KYC requests, or to non-transaction contexts such as mobile gaming or social media exchanges, etc.

In some embodiments, the dynamic workflow rendering may include providing a customized user experience. For example, a mobile application may render a first portion of a workflow based on user data, such as the user's age, gender, other types of biometric or biographical data, or user preferences. Based on the gathered user data, the mobile application may be able to render a first portion of a workflow that is generic to all users, but the mobile application needs the SDK 138 to render a second portion of the workflow that is customized specifically for the particular user. The SDK 138, working in conjunction with the backend services 198, may be able to provide and render a workflow that takes into account of the user's biometric data, biographical data, and/or user preferences. For example, the SDK 138 may render one type of workflow (e.g., a simpler UI with a plain background and fewer advertisements) for a user that is an older male that does not do much online shopping, and another type of workflow (e.g., a more sophisticated UI with a more aesthetic background and more advertisements) for a user that is a young female with extensive online shopping experience (and possibly having expressed interests in particular types or categories of goods/services). Therefore, the SDK 138 and the backend services 198 may provide a workflow that is not just dynamically rendered, but also specifically customized for a particular user. Furthermore, it is understood that the CIP request discussed above may be triggered by factors other than a monetary threshold, such as geographical location, or the type of goods/services involved, etc.

Figure 10:
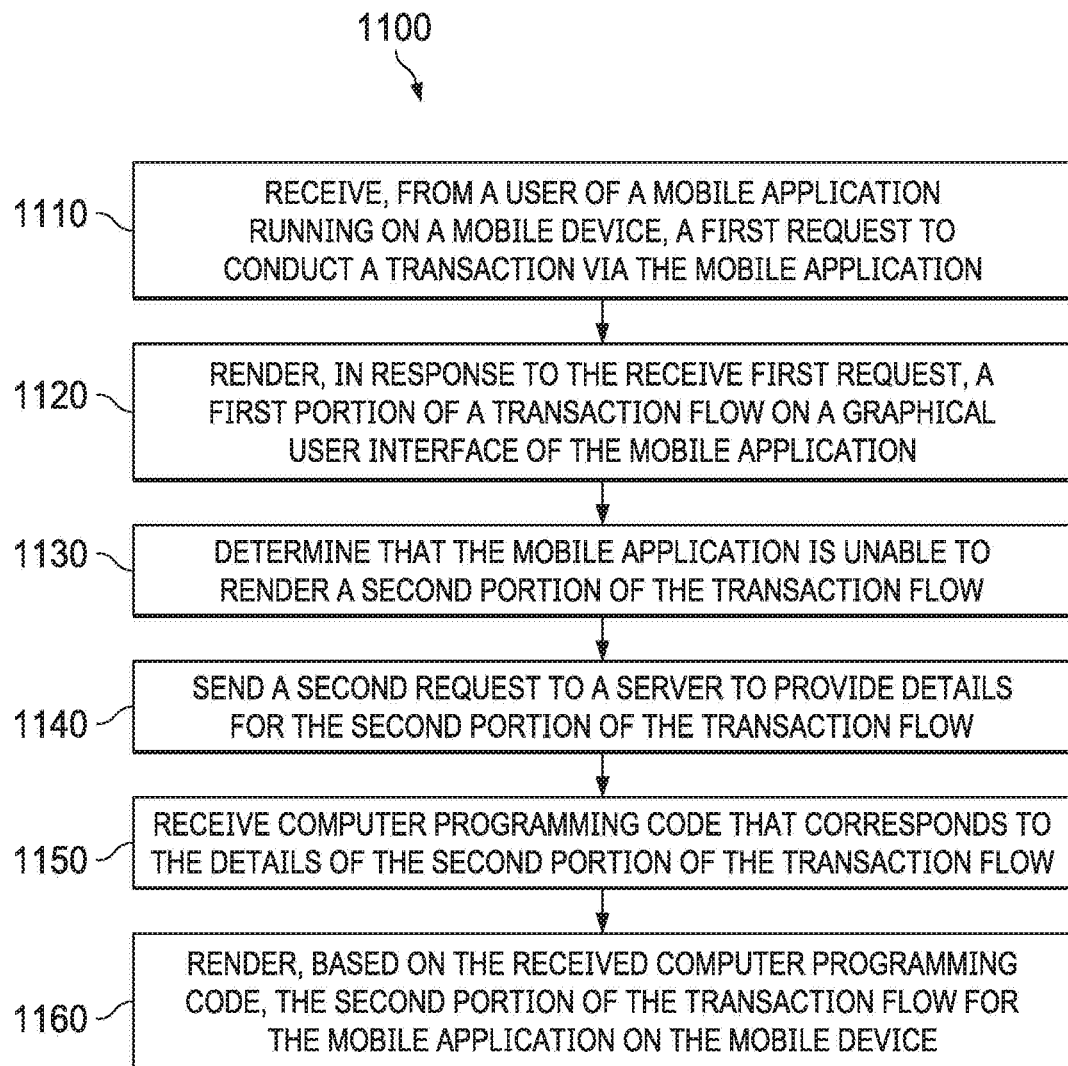
FIG. 10 is a flowchart illustrating a method of dynamically rendering workflows according to various aspects of the present disclosure.

FIG. 10 is a flowchart illustrating a method 1100 for dynamically rendering workflows according to various aspects of the present disclosure. The various steps of the method 1100, which are described in greater detail above, may be performed by one or more electronic processors, for example by the processors of a computer of an entity that may include: a payment provider, a business analyst, or a merchant. In some embodiments, at least some of the steps of the method 1100 may be performed by the SDK 138 and/or the backend services 198 discussed above.

The method 1100 includes a step 1110 to receive, from a user of a mobile application running on a mobile device, a first request to conduct a transaction via the mobile application.

The method 1100 includes a step 1120 to render, in response to the first request received in the step 1110, a first portion of a transaction flow on a graphical user interface of the mobile application.

The method 1100 includes a step 1130 to determine that the mobile application is unable to render a second portion of the transaction flow.

The method 1100 includes a step 1140 to send, in response to the determination made in the step 1130, a second request to a server to provide details for the second portion of the transaction flow.

The method 1100 includes a step 1150 to receive, after the step 1140, computer programming code that corresponds to the details of the second portion of the transaction flow.

The method 1100 includes a step 1160 to render, based on the received computer programming code, the second portion of the transaction flow for the mobile application on the mobile device.

In some embodiments, the steps 1110-1160 are performed without updating a version of the mobile application.

In some embodiments, the transaction involves a Consumer Identification Platform (CIP) request, and the step 1130 comprises determining that the mobile application is unable to complete the CIP request.

In some embodiments, the steps 1110 and 1120 are performed by the mobile application, and the steps 1130-1160 are performed by a Software Development Kit (SDK) that is implemented on the mobile device.

In some embodiments, the SDK is integrated into the mobile application.

In some embodiments, the SDK comprises a data collection module and a flow-rendering module. In some embodiments, the steps 1130-1150 are performed by the data collection module, and the step 1160 is performed by the flow-rendering module.

In some embodiments, the SDK is a first SDK, and the steps 1120 and/or 1160 comprises accessing a second SDK that is different from the first SDK.

In some embodiments, the details for the second portion of the transaction flow comprise a sequence of pages to be rendered. In some embodiments, the details for the second portion of the transaction flow comprise a layout of user interface (UI) elements to be rendered.

In some embodiments, the received computer programming code is in a JavaScript Object Notation (JSON) format.

It is understood that additional method steps may be performed before, during, or after the steps 1110-1160 discussed above. For example, the method 1100 may include a step to select, by the server, a transaction flow template from a plurality of transaction flow templates stored on the server. Each of the transaction flow templates specifies details of a respective transaction flow. Thereafter, the computer programming code that corresponds to the selected transaction flow template is sent by the server to the mobile device. As another example, the method 1100 may include a step of receiving additional computer programming code that corresponds to an altered transaction flow after the step after the step 1160. Based on the additional computer programming code, the altered transaction flow for the mobile application is rendered. Other steps may include authenticating or validating the user based on user input captured via the second portion of the transaction flow, and/or processing the transaction request accordingly. For reasons of simplicity, other additional steps are not discussed in detail herein. In some embodiments, one or more of the steps 110-1160 may also be omitted. For example, the steps 1110 or 1120 may be omitted in some embodiments.

Figure 11:
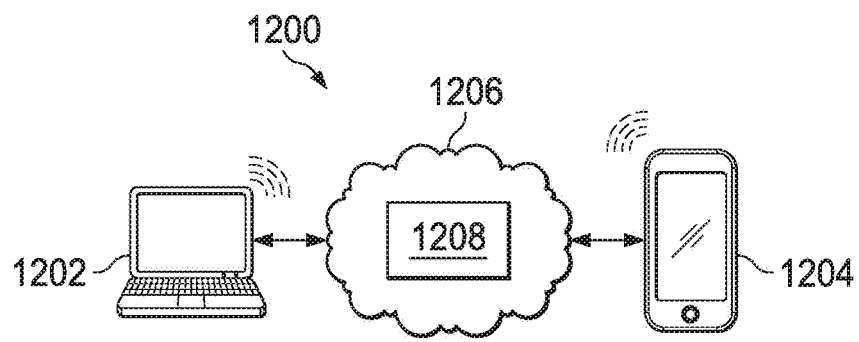
FIG. 11 is a simplified example of a cloud-based computing architecture according to various aspects of the present disclosure.

FIG. 11 illustrates an example cloud-based computing architecture 1200, which may also be used to implement various aspects of the present disclosure. The cloud-based computing architecture 1200 includes a mobile device 1204 (e.g., the user device 110 of FIG. 1) and a computer 1202 (e.g., the merchant server 140 or the payment provider server 170), both connected to a computer network 1206 (e.g., the Internet or an intranet). In one example, a consumer has the mobile device 1204 that is in communication with cloud-based resources 1208, which may include one or more computers, such as server computers, with adequate memory resources to handle requests from a variety of users. A given embodiment may divide up the functionality between the mobile device 1204 and the cloud-based resources 1208 in any appropriate manner. For example, an app on mobile device 1204 may perform basic input/output interactions with the user, but a majority of the processing may be performed by the cloud-based resources 1208. However, other divisions of responsibility are also possible in various embodiments. In some embodiments, using this cloud architecture, the backend services 198 may reside on the merchant server 140 or the payment provider server 170, and the SDK 138 may reside on the mobile device 1204.

The cloud-based computing architecture 1200 also includes the personal computer 1202 in communication with the cloud-based resources 1208. In one example, a participating merchant or consumer/user may access information from the cloud-based resources 1208 by logging on to a merchant account or a user account at computer 1202. The system and method for performing the dynamic rendering of workflows for mobile applications as discussed above may be implemented at least in part based on the cloud-based computing architecture 1200.

It is understood that the various components of cloud-based computing architecture 1200 are shown as examples only. For instance, a given user may access the cloud-based resources 1208 by a number of devices, not all of the devices being mobile devices. Similarly, a merchant or another user may access the cloud-based resources 1208 from any number of suitable mobile or non-mobile devices. Furthermore, the cloud-based resources 1208 may accommodate many merchants and users in various embodiments.

Figure 12:
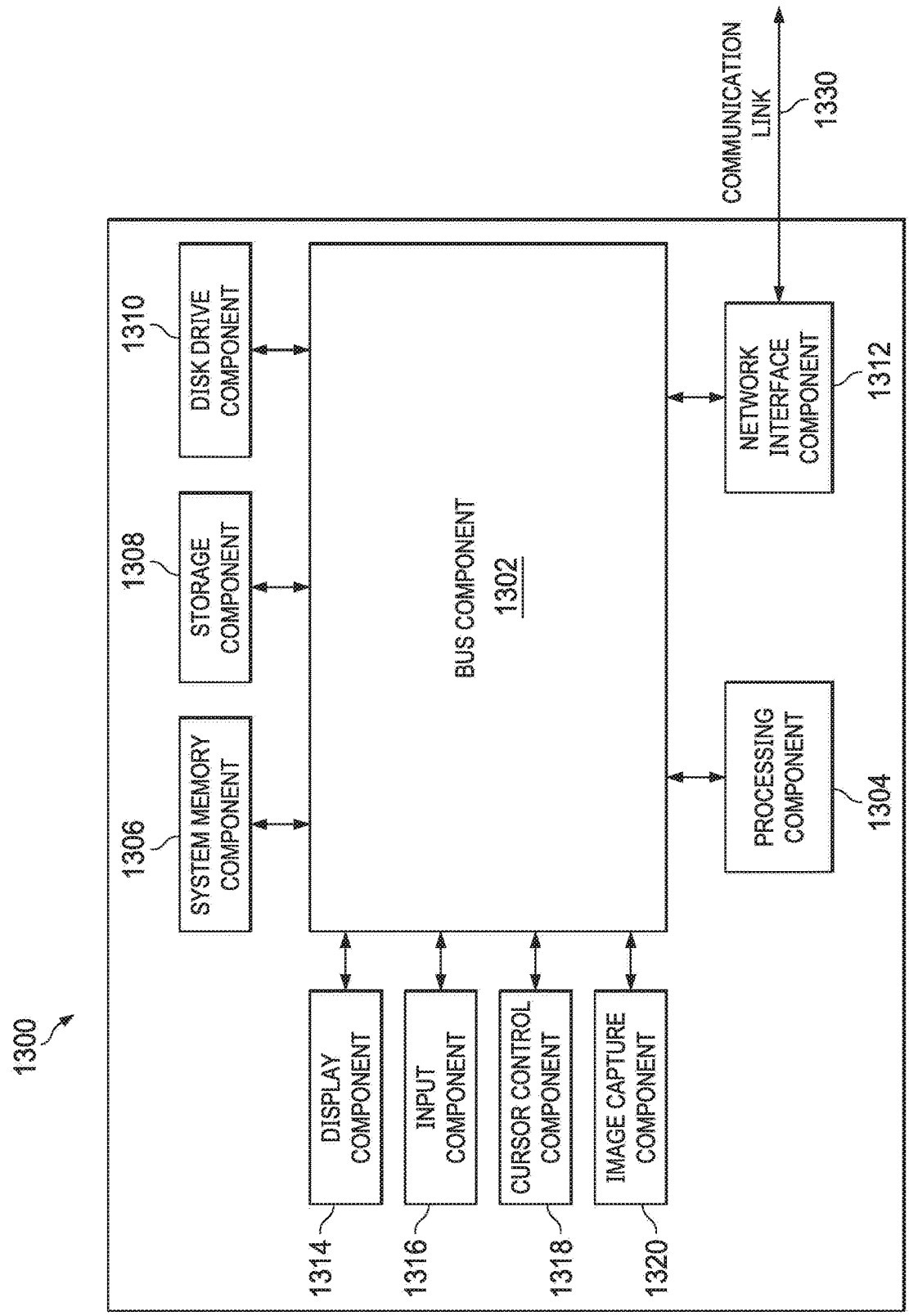
FIG. 12 illustrates a computer system according to various aspects of the present disclosure.

FIG. 12 is a block diagram of a computer system 1300 suitable for implementing various methods and devices described herein, for example, the SDK 138, the backend services 198, the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the SDK 138 or the backend services 198 and the various method steps of the method 1100 discussed above (or the user device 110, the merchant server 140, or the payment provider server 170) may be implemented as the computer system 1300 in a manner as follows.

In accordance with various embodiments of the present disclosure, the computer system 1300, such as a network server or a mobile communications device, includes a bus component 1302 or other communication mechanisms for communicating information, which interconnects subsystems and components, such as a computer processing component 1304 (e.g., processor, micro-controller, digital signal processor (DSP), etc.), system memory component 1306 (e.g., RAM), static storage component 1308 (e.g., ROM), disk drive component 1310 (e.g., magnetic or optical), network interface component 1312 (e.g., modem or Ethernet card), display component 1314 (e.g., cathode ray tube (CRT)

or liquid crystal display (LCD)), input component 1316 (e.g., keyboard), cursor control component 1318 (e.g., mouse or trackball), and image capture component 1320 (e.g., analog or digital camera). In one implementation, disk drive component 1310 may comprise a database having one or more disk drive components.

In accordance with embodiments of the present disclosure, computer system 1300 performs specific operations by the processor 1304 executing one or more sequences of one or more instructions contained in system memory component 1306. Such instructions may be read into system memory component 1306 from another computer readable medium, such as static storage component 1308 or disk drive component 1310. In other embodiments, hard-wired circuitry may be used in place of (or in combination with) software instructions to implement the present disclosure. In some embodiments, the various components of the SDK 138 and/or backend services 198 may be in the form of software instructions that can be executed by the processor 1304 to automatically perform context-appropriate tasks on behalf of a user.

Logic may be encoded in a computer readable medium, which may refer to any medium that participates in providing instructions to the processor 1304 for execution. Such a medium may take many forms, including but not limited to, non-volatile media and volatile media. In one embodiment, the computer readable medium is non-transitory. In various implementations, non-volatile media includes optical or magnetic disks, such as disk drive component 1310, and volatile media includes dynamic memory, such as system memory component 1306. In one aspect, data and information related to execution instructions may be transmitted to computer system 1300 via a transmission media, such as in the form of acoustic or light waves, including those generated during radio wave and infrared data communications. In various implementations, transmission media may include coaxial cables, copper wire, and fiber optics, including wires that comprise bus 1302.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the SDK 138 and/or the backend services 198 discussed above.

In various embodiments of the present disclosure, execution of instruction sequences to practice the present disclosure may be performed by computer system 1300. In various other embodiments of the present disclosure, a plurality of computer systems 1300 coupled by communication link 1330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1300 may transmit and receive messages, data, information and instructions, including one or more programs (i.e., application code) through communication link 1330 and communication interface 1312. Received program code may be executed by computer processor 1304 as received and/or stored in disk drive component 1310 or some other non-volatile storage component for execution. The communication link 1330 and/or the communication interface 1312 may be used to conduct electronic communications between the SDK 138 and the backend services 198, or between other components or the user device 110, the merchant server 140, or the payment provider server 170, depending on exactly where the SDK 138 and/or the backend services are implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the SDK 138 or the backend services 198 may be implemented as such software code.

Based on the above discussions, the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, conventional computer systems (e.g., as a smartphone or a tablet computer) are only able to render workflows that have been hard-coded into a mobile application running on the computer systems. In order to revise the workflow, a newer version of the mobile application would have to be downloaded and installed on the computer systems for the revised workflow to take effect. Even then, the newer version of the mobile application is still limited to one or more rigid workflows that are now hard-coded into the newer version of the mobile application. The lack of flexibility in workflow rendering limits the usefulness and versatility of the mobile applications for conventional computer systems. Furthermore, in some cases, the mobile application may lack the capability to render a workflow that is needed to complete a task (e.g., a certain type of transaction), which further limits the functionalities of the mobile applications for conventional computer systems In contrast, the SDK 138 and the backend services 198 of the present disclosure work in conjunction with each other to provide dynamic rendering of workflows for mobile applications, without requiring official updates to the mobile applications. In embodiments where a mobile application are only able to render a first portion of a workflow but not a second portion of the workflow, the SDK 138 and the backend services 198 may seamlessly complete the workflow by selecting a suitable programming code template, generating a detailed workflow based on the suitable programming code template, and sending the computer programming code corresponding to the detailed workflow to the SDK 138, which then renders the detailed workflow for the mobile application. Since the mobile applications can now render workflows dynamically (but were not able to do so before), the functionality of a computer is improved.

The problems of the present disclosure also arise in a specific technological environment, for example in an environment directed to Internet technology, and specifically mobile applications (rather than web applications) executing on mobile devices. For example, without Internet technology or mobile applications running on smartphones or tablet computers, the problems discussed above would not exist. Even in a web browsing context, the problems discussed above may not exist, since the workflow to be rendered according to a web browser are based on instructions received from a server corresponding to a Universal Resource Locator (URL). There are no hard-coded workflows in a web browsing context, and therefore the problems associated with a hard-coded workflow of a mobile application are unique and do not apply to the web browsing context. Again, the present disclosure overcomes this problem via the implementations of the SDK 138 and the backend services 198 as discussed above.

The inventive ideas of the present disclosure are also integrated into a practical application, for example into the mobile application 200 (or the SDK 138) discussed above. Such a practical application can generate workflows dynamically, which is practical and useful in many contexts, for example in a KYC or CIP context.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: receiving, from a user of a mobile application running on a mobile device, a first request to conduct a transaction via the mobile application; rendering, in response to the receiving of the first request, a first portion of a transaction flow on a graphical user interface of the mobile application; determining that the mobile application is unable to render a second portion of the transaction flow; sending, in response to the determining, a second request to a server to provide details for the second portion of the transaction flow; receiving, after the sending, computer programming code that corresponds to the details of the second portion of the transaction flow; and rendering, based on the received computer programming code, the second portion of the transaction flow for the mobile application on the mobile device.

Another aspect of the present disclosure involves a system that includes a non-transitory memory and one or more hardware processors coupled to the non-transitory memory and configured to read instructions from the non-transitory memory to cause the system to perform operations comprising: determining that a mobile application running on a mobile device needs assistance in rendering a workflow to complete a transaction; sending, in response to the determining, a request to a server to obtain specifications of the workflow; obtaining, from the server, computer programming code corresponding to the specifications of the workflow; interpreting the computer programming code to extract the specifications of the workflow; and rendering the workflow via a user interface of the mobile device based on the extracted specifications.

Yet another aspect of the present disclosure involves a non-transitory machine-readable medium having stored thereon machine-readable instructions executable to cause a machine to perform operations comprising: receiving, from a user of a mobile application running on a mobile device, a Consumer Identification Platform (CIP) request, wherein the mobile application has rendered a first portion of a transaction flow via a graphical user interface (GUI) of the mobile device; determining that the mobile application lacks a capability to render a second portion of the transaction flow; communicating with a server in response to the determining; obtaining, based on the communicating, computer programming code corresponding to the second portion of the transaction flow; and rendering, for the mobile application, the second portion of the transaction flow via the GUI based on the computer programming code.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
receiving an input through a graphical user interface (GUI) of a mobile application executing on a mobile device, wherein the input is received via a first workflow that is present within the mobile application, wherein the first workflow is associated with a first manner in which one or more pages of the mobile application is presented via the GUI;
determining, based at least in part on the received input, that the mobile application is directed to rendering a second workflow that is not present within the mobile application, wherein the second workflow is associated with a second manner in which the one or more pages of the mobile application is presented via the GUI;
accessing, after the determining and based on electronic communications with a remote server, computer programming code associated with the second workflow; and
causing, based on the accessing of the computing programming code, a rendering of the second workflow via the GUI.

2. The method of claim 1, wherein:
the electronic communications comprise a request to the remote server to obtain specifications of the second workflow; and
the accessing comprises obtaining, from the remote server, the computer programming code corresponding to the specifications of the second workflow.

3. The method of claim 1, wherein the electronic communications comprises electronic communications with a module of the remote server that stores a plurality of predefined programming code templates, each of the plurality of the predefined programming code templates corresponding to a different type of workflow, including the second workflow.

4. The method of claim 3, wherein each of the plurality of the predefined programming code templates defines a structure of data points or layout specifications of user interface elements involved in a rendering of the corresponding workflow.

5. The method of claim 1, further comprising:
receiving, during the rendering of the second workflow, additional input via the GUI;
determining, based on the received additional input, that a third workflow, and not the second workflow should be used for processing the received additional input;
obtaining, based on the determining that the third workflow should be used for processing the received additional input, computer programming code associated with the third workflow from the remote server; and
causing, based on the obtained computer programming code associated with the third workflow, a rendering of the third workflow via the GUI while the rendering of the second workflow is interrupted.

6. The method of claim 1, wherein the first workflow, but not the second workflow, is hardcoded into the mobile application.

7. The method of claim 1, wherein the second workflow comprises one or more prepopulated data fields of the GUI.

8. The method of claim 1, further comprising:
accessing data entered by a user via the second workflow;
sending the data to the remote server for analysis; and
receiving, from the remote server, a notification indicating whether the user has been successfully authenticated based on the data sent to the remote server.

9. The method of claim 1, wherein one or more of the receiving, the determining, the accessing, or the causing are performed by a first Software Development Kit (SDK) that is implemented on the mobile device.

10. The method of claim 9, further comprising accessing a second SDK that provides one or more services,
wherein one or more aspects of the second workflow is rendered based at least in part on the one or more services provided by the second SDK.

11. The method of claim 1, wherein the second workflow is rendered without updating a version of the mobile application.

12. The method of claim 1, wherein the first workflow or the second workflow is rendered as a part of an electronic transaction conducted via the mobile application.

13. A system, comprising:
one or more processors; and
a non-transitory computer-readable medium having stored thereon instructions that are executable by the one or more processors to cause the system to perform operations comprising:
receiving an input through a graphical user interface (GUI) of a mobile application executing on a mobile device, wherein the input is received via a first workflow that is present within the mobile application;
determining, based at least in part on the received input, that the mobile application is directed to rendering a second workflow that is not present within the mobile application, wherein the first workflow and the second workflow each define each define how different pages of the mobile application are presented via the GUI, respectively;
accessing, after the determining and based on electronic communications with a remote server, computer programming code associated with the second workflow; and
causing, based on the accessing of the computing programming code, a rendering of the second workflow via the GUI.

14. The system of claim 13, wherein:
the electronic communications comprise a request to the remote server to obtain specifications of the second workflow; and
the accessing comprises obtaining, from the remote server, the computer programming code corresponding to the specifications of the second workflow.

15. The system of claim 13, wherein the electronic communications comprises electronic communications with a module of the remote server that stores a plurality of predefined programming code templates, each of the plurality of the predefined programming code templates corresponding to a different type of workflow, including the second workflow, and wherein each of the plurality of the predefined programming code templates defines a structure of data points or layout specifications of user interface elements involved in a rendering of the corresponding workflow.

16. The system of claim 15, wherein each of the plurality of the predefined programming code templates defines a structure of data points or layout specifications of user interface elements involved in a rendering of the corresponding workflow, wherein the operations further comprise:
receiving, during the rendering of the second workflow, additional input via the GUI;
determining, based on the received additional input, that a third workflow, and not the second workflow should be used for processing the received additional input;
obtaining, based on the determining that the third workflow should be used for processing the received additional input, computer programming code associated with the third workflow from the remote server; and
causing, based on the obtained computer programming code associated with the third workflow, a rendering of the third workflow via the GUI while the rendering of the second workflow is interrupted.

17. The system of claim 13, wherein the first workflow, but not the second workflow, is hardcoded into the mobile application.

18. The system of claim 13, wherein the second workflow is rendered without updating a version of the mobile application.

19. A non-transitory machine-readable medium having stored thereon machine-readable instructions executable to cause a machine to perform operations comprising:
receiving an input through a graphical user interface (GUI) of a mobile application executing on a mobile device, wherein the input is received via a first workflow that is present within the mobile application, wherein the first workflow specifies a first sequence of presenting, via the GUI, a plurality of different pages of the mobile application;
determining, based at least in part on the received input, that the mobile application is directed to rendering a second workflow that is not present within the mobile application, wherein the second workflow specifies a second sequence of presenting, via the GUI, the plurality of different pages of the mobile application;
accessing, after the determining and based on electronic communications with a remote server, computer programming code associated with the second workflow; and
causing, based on the accessing of the computing programming code, a rendering of the second workflow via the GUI.

20. The non-transitory machine-readable medium of claim 19, wherein the electronic communications comprises electronic communications with a module of the remote server that stores a plurality of predefined programming code templates, each of the plurality of the predefined programming code templates corresponding to a different type of workflow, including the second workflow, and wherein each of the plurality of the predefined programming code templates defines a structure of data points or layout specifications of user interface elements involved in a rendering of the corresponding workflow.

* * * * *